United States Patent [19]

Gregory et al.

[11] Patent Number: 5,592,068

[45] Date of Patent: *Jan. 7, 1997

[54] LEAD ACID BATTERY REJUVENATOR

[75] Inventors: William E. Gregory, 700 Kosstre Ct., Irving, Tex. 75061; Chester C. Allen, Jr., Richardson, Tex.

[73] Assignee: William E. Gregory, Irving, Tex.

[*] Notice: The term of this patent shall not extend beyond the expiration date of Pat. No. 5,491,399.

[21] Appl. No.: 558,678

[22] Filed: Nov. 16, 1995

Related U.S. Application Data

[63] Continuation of Ser. No. 92,515, Jul. 16, 1993, Pat. No. 5,491,399, which is a continuation-in-part of Ser. No. 68,159, May 28, 1993, abandoned.

[51] Int. Cl.$^6$ .............................. H01M 10/46; H02J 7/10
[52] U.S. Cl. ................................. 320/21; 320/2; 320/61
[58] Field of Search .................................. 320/2, 61, 21; 323/906; 363/18, 19, 20, 21

[56] References Cited

U.S. PATENT DOCUMENTS

| | | |
|---|---|---|
| 3,553,561 | 1/1971 | Lesher . |
| 3,579,075 | 5/1971 | Floyd . |
| 3,586,955 | 6/1971 | Kisiel . |
| 3,629,681 | 12/1971 | Gurwicz . |
| 3,663,939 | 5/1972 | Olsson . |
| 3,816,807 | 6/1974 | Taylor . |
| 3,963,976 | 6/1976 | Clark . |
| 4,183,080 | 1/1980 | Liebman . |
| 4,214,198 | 7/1980 | Schneider . |
| 4,237,409 | 12/1980 | Sugalski . |
| 4,246,634 | 1/1981 | Purol . |
| 4,302,714 | 11/1981 | Vefsky . |
| 4,320,333 | 3/1982 | Hase . |
| 4,355,275 | 10/1982 | Anglin . |
| 4,363,005 | 12/1982 | Kuroda et al. . |
| 4,366,430 | 12/1982 | Wright . |
| 4,371,827 | 2/1983 | Mullersman et al. . |
| 4,386,308 | 5/1983 | Emile, Jr. et al. . |
| 4,388,583 | 6/1983 | Krueger . |
| 4,388,584 | 6/1983 | Dahl et al. . |
| 4,389,608 | 6/1983 | Dahl et al. . |
| 4,396,881 | 8/1983 | Cook et al. . |
| 4,513,238 | 4/1985 | Orban . |
| 4,568,869 | 2/1986 | Graham, Jr. . |
| 4,584,514 | 4/1986 | Kaminski . |
| 4,609,860 | 9/1986 | Fasen . |
| 4,695,784 | 9/1987 | Reynolds . |
| 4,697,136 | 9/1987 | Ishikawa . |
| 4,750,102 | 6/1988 | Yamano et al. . |
| 4,843,299 | 6/1989 | Hutchings . |
| 4,871,959 | 10/1989 | Gali ........................................... 320/61 |
| 4,882,663 | 11/1989 | Nilssen . |
| 4,947,124 | 8/1990 | Hauser . |
| 4,965,507 | 10/1990 | Smilanich et al. . |
| 5,049,804 | 9/1991 | Hutchings . |

(List continued on next page.)

FOREIGN PATENT DOCUMENTS

| | | |
|---|---|---|
| 0336381A2 | 4/1989 | European Pat. Off. . |
| 0593196A2 | 6/1993 | European Pat. Off. . |
| WO91/19343 | 12/1991 | WIPO . |
| WO92/07404 | 4/1992 | WIPO . |

*Primary Examiner*—Peter S. Wong
*Assistant Examiner*—Patrick B. Law
*Attorney, Agent, or Firm*—Jenkens & Gilchrist, P.C.

[57] ABSTRACT

A rejuvenator for lead acid batteries powered by a multi-solar cell unit and/or a rectified a.c. source, the output of which is applied to a capacitor. The output of the capacitor is in turn connected across the primary of a transformer. A switching circuit connects and disconnects the primary coil to and from the capacitor to produce in the secondary coil of the transformer a fast rise time current pulse for application to a battery. A positive temperature coefficient resistor is connected in series with an output terminal of the rejuvenator to protect the rejuvenator components in the event the output terminals, through accident or mistake, are connected to battery terminals of opposite polarity.

16 Claims, 2 Drawing Sheets

U.S. PATENT DOCUMENTS

| | | | |
|---|---|---|---|
| 5,063,341 | 11/1991 | Gali | 320/21 |
| 5,084,664 | 1/1992 | Gali | 320/61 |
| 5,172,044 | 12/1992 | Sasaki et al. | |
| 5,254,951 | 10/1993 | Goto et al. | |
| 5,274,321 | 12/1993 | Matsuda | |
| 5,276,393 | 1/1994 | Gali | 320/21 |
| 5,289,102 | 2/1994 | Toya | |
| 5,290,643 | 3/1994 | Chen | |
| 5,291,118 | 3/1994 | Kojima | |
| 5,491,399 | 2/1996 | Gregory et al. | 320/61 |

LEAD ACID BATTERY REJUVENATOR

CROSS REFERENCE TO RELATED APPLICATIONS

This application is a continuation of application Ser. No. 08/092,515 filed Jul. 16, 1993, now U.S. Pat. No. 5,491,399, which is a continuation-in-part of application Ser. No. 08/068,159 filed May 28, 1993, now abandoned.

BACKGROUND OF THE INVENTION

1. Technical Field of the Invention

This invention relates, in general, to battery maintenance devices, and more particularly to a lead acid battery rejuvenator for removing or inhibiting the growth of sulfate deposits.

2. Description of Related Art

During the use of lead acid batteries, lead sulfate deposits slowly build up on the plates to partially cover sponge lead and lead oxide plate surfaces. After a period of time the sulfate deposits crystallize and offer a high impedance to the flow of ions, thus reducing the efficiency of the battery. Low D.C. current recharging is ineffective in dislodging sulfate deposits. Over the years efforts have been made to dislodge these deposits by a fast charging technique which generally overheats and warps the plates in the battery. While a battery may still appear to have taken a charge, and even the electrolyte may check as being correct, the battery does not hold a charge as the plates become effectively shorted. Efforts have been made utilizing a series of fast rise time voltage pulses to release the sulfates from the battery plate surfaces, the released sulfates either going into solution or spalling off and dropping to the bottom of the battery case. Such a technique is described in U.S. Pat. No. 5,084,664 issued to Carl E. Gali and entitled, "Solar Powered Lead Acid Battery Rejuvenator and Trickle Charger."

SUMMARY OF THE INVENTION

The present invention comprises a circuit for generating a pulsed output signal having predetermined current and voltage signal characteristics beneficial for removing or inhibiting sulfate deposit growth in batteries. The current signal characteristics for each pulse of the signal comprise a substantially linear rise in current followed by a substantially linear decay in current. The voltage signal characteristics for each pulse of the signal comprise substantially linear decay in voltage, followed by an exponential decay in voltage.

The present invention further comprises a flyback switching circuit for use in generating a pulsed signal for application to a battery. The flyback switching circuit senses voltage stored in a capacitor. Responsive to a sensed voltage exceeding a first value, the voltage stored in the capacitor is transferred to the primary coil of a transformer. Responsive to a subsequent drop in sensed voltage to a value less than a second value, the transferred voltage flies back into the secondary coil of the transformer for pulsed application to the battery.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
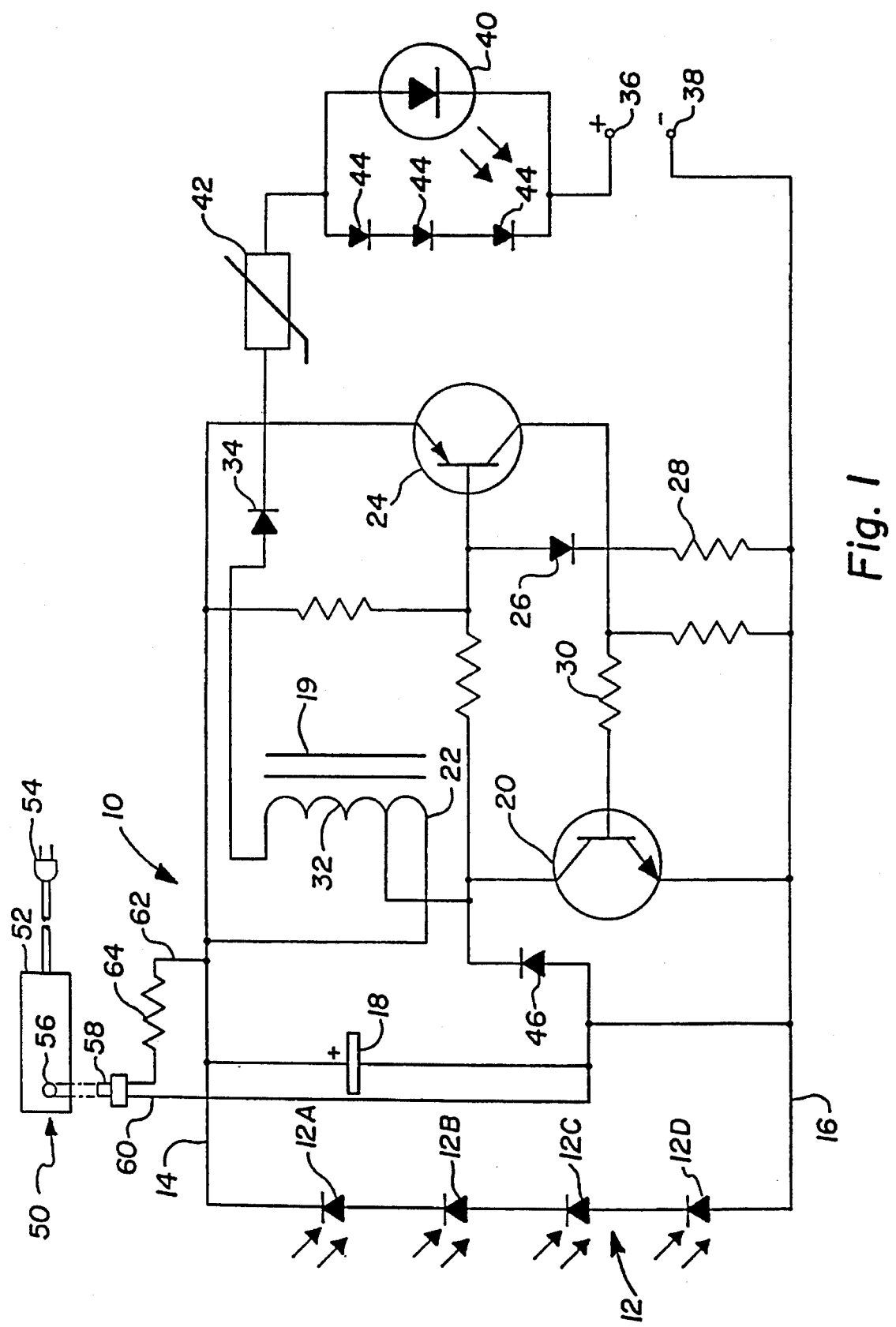
FIG. 1 is a circuit schematic for the rejuvenator of the present invention.

Referring now to the Drawings, and in particular to FIG. 1, a power source for the battery rejuvenator 10 of the present invention is shown comprising a bank of solar cells 12, including four solar cells, 12A, 12B, 12C, and 12D connected in series. Each cell is capable of producing an output voltage of approximately 0.5 volts and therefore the voltage output from the bank of solar cells 12 is approximately two volts. Another power source 50 is shown available to be connected in parallel with, or used as an alternative to, the bank of solar cells 12 to the rejuvenator 10 when the battery to be rejuvenated (not shown) is located in a darkened environment.

The current output of a solar cell is dependent upon the amount of incident light falling upon the cell. For a given incident light level, a solar cell puts out 250 milliamps. Above 250 milliamps the voltage output drops quickly. Below 250 milliamps the output voltage is fairly constant.

The output of the solar cell bank 12 is applied by way of conductors 14 and 16 and capacitor 18 to a flyback network comprised of transformer 19 and switching transistor 20. Current continues to flow into the capacitor 18 from the solar cell bank until the capacitor voltage reaches the maximum output voltage of the solar cell bank 12. The voltage across (i.e., stored in) the capacitor 18 is sensed by another part of the flyback network including switching transistor 24, switching diode 26, and resistor 28. Switching transistor 24 turns on when the sensed voltage across the capacitor 18 reaches the value $V_{on}$. The value of voltage $V_{on}$ can be expressed as:

$$V_{on} \approx V_{be} + V_f + I_{b2} \times R_{28} \quad (1)$$

Where:

$V_{be}$=the base-emitter voltage of transistor 24

$V_f$=forward voltage drop of diode 26

$I_{b2}$=the base drive current of transistor 24

$R_{28}$=resistance of the resistor R28.

Turning on of the switching transistor 24 turns on switching transistor 20. With switching transistor 20 on and conducting, current flows from the capacitor 18 through the primary coil 22 of the transformer 19 to magnetize the core of the transformer. These transistors 20 and 24 remain on while energy is transferred from the capacitor 18 to the primary coil of transformer 19. That transfer causes a decrease in the voltage stored in the capacitor 18.

When the voltage of capacitor 18 drops below the value required to sustain a minimum base current drive for the transistor 20, both transistor 20 and transistor 24 turn off. The value of the voltage at which the transistors 20 and 24 turn off, $V_{off}$, may be expressed as follows:

$$V_{off} = 2 \times V_{sat} + I_{b1} \times R_{30} \quad (2)$$

Where:

$V_{sat}$=saturation voltage of transistor 20 or transistor 24

$I_{b1}$=base current drive for transistor 20 or transistor 24

$R_{30}$=the resistance of resistor 30

When voltage $V_{off}$ has been attained, switching transistor 20 turns off, the voltage transferred to the primary coil 22 then flies back in the secondary coil 32 of the transformer 19 as a pulse having a voltage value determined in part by the load, which includes the battery (not shown) and diode 34, together with the turns ratio of the secondary coil 32 of the transformer 19 with respect to the primary coil 22. By appropriate selection of the turns ratio, the flyback voltage pulses may be utilized to rejuvenate either a 12 volt, a 24 volt, or a 36 volt battery.

Figure 2:
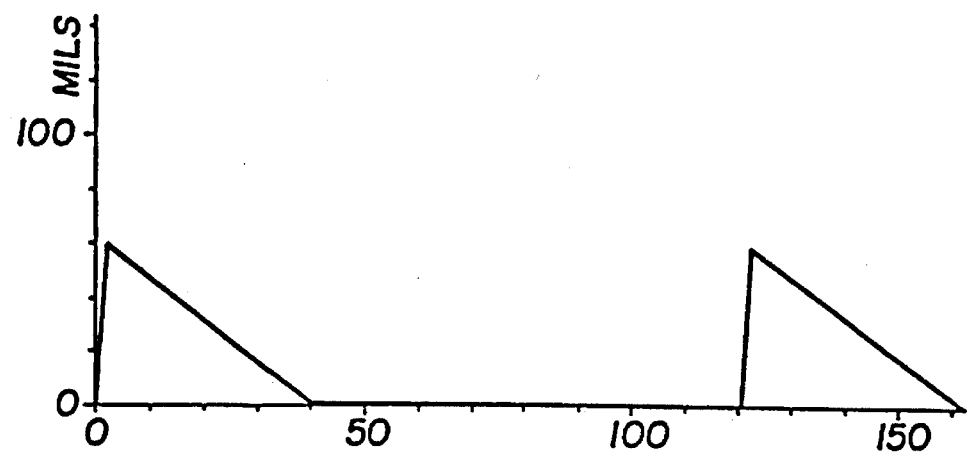
FIG. 2 illustrates the current wave form output from the circuit of FIG. 1.
Figure 3:
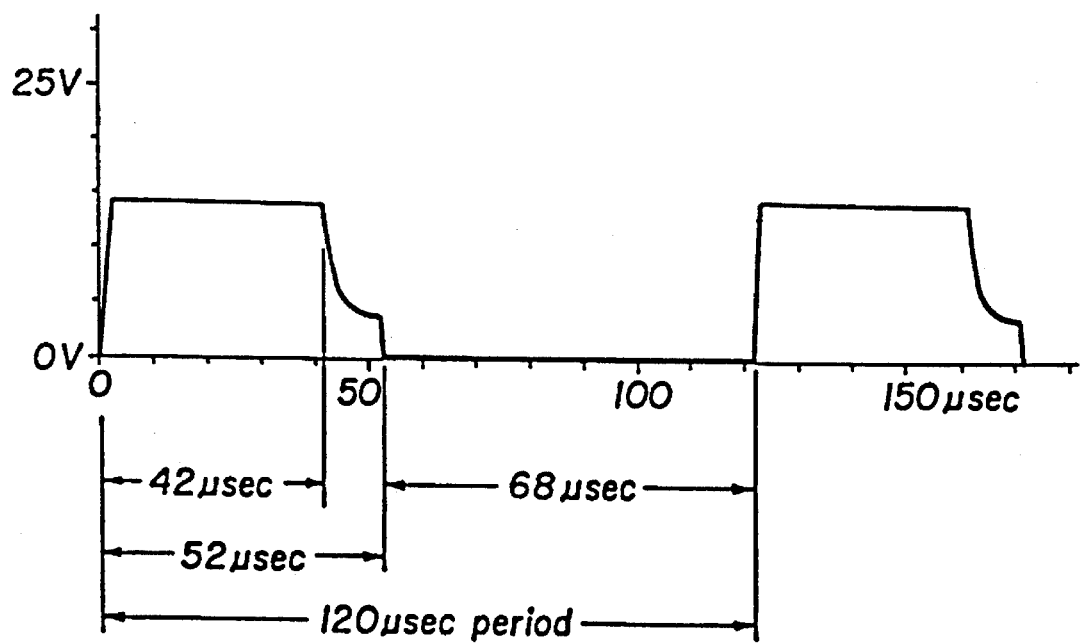
FIG. 3 illustrates the voltage wave form output from the circuit of FIG. 1.

The flyback voltage pulses cause diode 34 to forward bias and transfer current produced by induction in the secondary coil 32 of the transformer 19 to a battery (not shown) that is connected to terminals 36 and 38 of the circuit 10. The character of the current signal produced is in the form of a train of high frequency current pulses as illustrated in FIG. 2. Wave forms representative of the current pulses shown in FIG. 2 were obtained with a 10 ohm resistor load connected across terminals 36 and 38. It will be observed that the current rise time is quite abrupt and then decays to a base current level of zero amps in approximately 42μ seconds. The current pulse peaks at 60 milliamps and had a repetition rate of substantially 8.333 kilo Hz. The character of the voltage signal produced is in the form of a train of high frequency voltage pulses as illustrated in FIG. 3. It will be observed that the voltage is shown to rise very sharply to a value of approximately 14 volts. The value of the voltage pulse then falls off very slowly until the value of the current reaches zero, whereupon the voltage drops exponentially and finally reaches a base voltage level of zero volts in approximately 52μ seconds.

The peak pulse current produced by circuit 10 is greater than the leakage discharge current in an automobile battery. The effect of this is that a small average charge current can be effective in trickle charging and reducing or eliminating sulfate buildup on the plates of the lead acid storage battery over an extended period of time. The battery will therefore retain its ability to provide starting current over a long time and can be quickly re-charged by a high current charger. The gentle spalling off of sulfate deposits from the plates of the battery by use of the present invention will allow the recovery and subsequent recharging of even old, otherwise unusable batteries.

A visual indication that circuit 10 is operating is provided by a light emitting diode (LED) 40 connected in series with the positive terminal 36.

The various components of circuit 10 are protected against an inadvertent opposite polarity connection of the terminals 36 and 38 to the battery terminals (not shown). When such a misconnection occurs, a high surge of current would occur, passing through diode 34 and damaging components of rejuvenator 10. Resistor 42 is provided to protect components of rejuvenator 10 from high current surges that might result from an error in misconnecting the terminals 36 and 38 to the battery posts. Resistor 42 is connected in series with the diode 34 and the positive terminal 36, and comprises a positive temperature coefficient resistor whose resistance increases significantly at a fairly low temperature. This change in resistance occurs rapidly and causes the current to fall to a level or levels that can be tolerated by the various components of the circuit 10. The components nominally can tolerate a current of one ampere.

Protecting the LED 40 from high current surges are a plurality of series-connected diodes 44, in turn connected in parallel with the LED 40. These diodes offer a very low impedance to current flow. In the event of a misconnection of the terminals, most of the current will flow through the diodes 44 to the positive temperature coefficient resistor 42. Further protection is provided for the solar cell bank 12 by the inclusion of diode 46 to prevent current flow to the solar cells when the terminals 36 and 38 are connected backwards to the battery terminals.

The output of the rejuvenator 10 may be applied to the battery terminals by way of a plug connected to output terminals 36 and 38, and inserted into a cigarette lighter located in a vehicle. In the alternative, the output of the rejuvenator 10 may be applied by way of an extension cord and clips to be connected directly to the battery terminals. It is this latter alternative connection that could give rise to an error in connecting the output of the rejuvenator to the battery to be treated.

Identification of some of the components utilized in the circuit 10 of FIG. 1 are as follows:

Transistor 20 is Texas Instruments T1P41A power Transistor.

Transistor 24 is Motorola 2N4403 PNP Transistor.

Diodes 34, 44, and 46 are Motorola 1N4001 silicon rectifiers.

Resistor 42 is a Phillips 2322-661-11211 Positive Temperature Coefficient Resistor.

The other power source 50, to be connected when the battery is in a darkened environment, is shown comprising an a.c. to d.c. converter 52. The converter 52 can be connected to a local source of a.c., usually 115 volts, by way of plug 54 to produce a d.c. voltage at its output 56. The d.c. voltage is accessed by the rejuvenator 10 by way of plug 58 connected in parallel with the solar cell bank 12 through conductors 60 and 62.

The converter 52 is available commercially and typically is of the type used to operate portable radios, hand held calculators and the like. In a prototype constructed of the present invention, the converter 52 had an output of 7.5 volts and 300 ma. In as much as the parameters of the rejuvenator 10 dictated a d.c. source of two (2) volts, resistor 64, having a value of eighteen (18) ohms, was added in series with conductor 62 to drop the voltage to two (2) volts. As the parameters of the rejuvenator and trickle charger 10 are changed by the use of Mosfet elements, the voltage output of the source 50 can be changed. In addition a source 50 may be found having an output voltage of two (2) volts and thus eliminate the need for the dropping resistor 64.

Now that the invention has been described, alternatives will occur to those skilled in the art and it is intended that this application cover such modifications or alternatives by way of the appended claims. For example, the number of solar cells in bank 12 could be reduced to 1 through the use of Mosfet transistors which are operable at lower voltage levels; for example ½ volt.

What is claimed is:

1. A battery rejuvenator, comprising:
   a switching circuit for generating a pulse train signal having predetermined current and voltage signal characteristics, the predetermined current signal characteristic comprising for each pulse in the pulse train signal a substantially linear rise in current from a base current level at a first current rate followed by a substantially linear decay in current to the base current level at a second current rate less than the first rate, and the predetermined voltage signal characteristic comprising for each pulse in the pulse train signal a substantially linear rise in voltage from a base voltage level at a first voltage rate, followed by a substantially linear decay in voltage at a second voltage rate less than the first voltage rate, and then followed by an exponential decay in voltage to the base voltage level; and means for connecting the generated pulse train signal having the predetermined current and voltage signal characteristics to a pair of terminals for a battery to remove or inhibit sulfate deposit growth.

2. The battery rejuvenator as in claim 1 wherein the switching circuit comprises a flyback switching circuit.

3. The battery rejuvenator as in claim 2 wherein the flyback switching circuit comprises:

a capacitor;

a transformer having a primary coil and having a secondary coil, the secondary coil connected through the means for connecting to the battery; and switching means for sensing a voltage stored in the capacitor, the switching means operating responsive to a sensed voltage exceeding a first value to transfer stored voltage from the capacitor to the primary coil of the transformer, and operating responsive to a subsequent drop in sensed voltage to less than a second value to flyback the transferred voltage from the primary coil to the secondary coil of the transformer for application to the battery as one pulse in the pulse train signal.

4. The battery rejuvenator as in claim 3 further including a positive temperature coefficient resistor connected in series between the secondary coil and the means for connecting.

5. The battery rejuvenator as in claim 1 wherein the transition from the substantially linear decay in voltage to the exponential decay in voltage for the predetermined voltage signal characteristic occurs when the substantially linear decay in current reaches the base current level.

6. The battery rejuvenator as in claim 1 wherein the pulse train signal has a frequency of approximately eight kilohertz.

7. The battery rejuvenator as in claim 6 wherein the frequency is substantially 8.3 kilohertz.

8. The battery rejuvenator as in claim 1 wherein the base current level is substantially zero amps and the base voltage level is substantially zero volts.

9. A battery rejuvenator, comprising:

a capacitor;

a transformer having a primary coil and having a secondary coil;

means for connecting the secondary coil of the transformer to a battery; and switching means for sensing a voltage stored in the capacitor, the switching means operating responsive to a sensed voltage exceeding a first value to transfer stored voltage from the capacitor to the primary coil of the transformer, and operating responsive to a subsequent drop in sensed voltage to less than a second value to flyback the transferred voltage from the primary coil to the secondary coil of the transformer for pulsed application to the battery through the means for connecting.

10. The battery rejuvenator as in claim 9 further including a positive temperature coefficient resistor connected in series between the secondary coil and the means for connecting.

11. The battery rejuvenator as in claim 9 wherein the switching means comprises:

a first transistor for connecting and disconnecting the capacitor to and from the primary coil of the transformer; and a second transistor connected to sense the voltage stored in the capacitor and further connected to control the connection and disconnection operation performed by the first transistor and thus connect the capacitor to the primary coil when the sensed voltage exceeds the first value, and disconnect the capacitor from the primary coil when the sensed voltage subsequently drops to less than the second value.

12. A battery rejuvenator, comprising:

a capacitor;

a transformer having a primary coil and having a secondary coil;

a first switch functioning when turned on to connect the capacitor in parallel with the primary coil of the transformer, and when turned off to disconnect the capacitor from the primary coil of the transformer;

a second switch connected to sense a voltage stored in the capacitor and in response thereto turn the first switch on and off thereby generating a pulse train signal at the secondary coil of the transformer; and means for connecting the generated pulse train signal at the secondary coil to a pair of terminals for a battery to remove or inhibit the growth of sulfate deposits.

13. The battery rejuvenator as in claim 12 wherein the pulse train signal has a frequency of approximately eight kilohertz.

14. The battery rejuvenator as in claim 13 wherein the frequency is substantially 8.3 kilohertz.

15. The battery rejuvenator as in claim 13 further including a positive temperature coefficient resistor connected in series between the secondary coil and the means for connecting.

16. The battery rejuvenator as in claim 13 wherein the second switch turns the first switch on when the sensed voltage in the capacitor rises to exceed a first value, and turns the first switch off when the sensed voltage in the capacitor falls below a second value.

\* \* \* \* \*